United States Patent
Sakakibara

(10) Patent No.: US 11,640,729 B2
(45) Date of Patent: May 2, 2023

(54) SOUND OUTPUT DEVICE AND SOUND OUTPUT METHOD

(71) Applicant: Panasonic Intellectual Property Management Co., Ltd., Osaka (JP)

(72) Inventor: Takao Sakakibara, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/703,197

(22) Filed: Mar. 24, 2022

(65) Prior Publication Data

US 2022/0319247 A1 Oct. 6, 2022

(30) Foreign Application Priority Data

Mar. 30, 2021 (JP) .............................. JP2021-057112

(51) Int. Cl.
*G07C 5/02* (2006.01)
*G10K 15/02* (2006.01)
*H04R 1/02* (2006.01)

(52) U.S. Cl.
CPC .............. *G07C 5/02* (2013.01); *G10K 15/02* (2013.01); *H04R 1/025* (2013.01); *H04R 2499/13* (2013.01)

(58) Field of Classification Search
CPC ..... G10K 15/02; H04R 1/025; H04R 2499/13
USPC .......................................................... 381/86
See application file for complete search history.

(56) References Cited

U.S. PATENT DOCUMENTS

| 2011/0211710 | A1  | 9/2011  | Nagasawa et al. |
| 2015/0353007 | A1  | 12/2015 | Inoue et al. |
| 2015/0364125 | A1* | 12/2015 | Park ...................... G10K 15/02 701/36 |

FOREIGN PATENT DOCUMENTS

| JP | 5541162     | 7/2014  |
| JP | 2015-229403 | 12/2015 |

* cited by examiner

*Primary Examiner* — Sean H Nguyen
(74) *Attorney, Agent, or Firm* — Greenblum & Bernstein, P.L.C.

(57) ABSTRACT

A sound output device provided in a vehicle includes: an obtainer that obtains a drive state of the vehicle; a generator that generates a simulated vehicle sound signal based on the drive state obtained; an outputter that outputs the simulated vehicle sound signal generated; a determiner that determines that a first wheel of the vehicle is free spinning when the drive state obtained suddenly changes; and a corrector that corrects the simulated vehicle sound signal generated based on the drive state that has suddenly changed, when the determiner determines that the first wheel is free spinning. The outputter outputs the simulated vehicle sound signal corrected.

12 Claims, 13 Drawing Sheets

SOUND OUTPUT DEVICE AND SOUND OUTPUT METHOD

CROSS REFERENCE TO RELATED APPLICATION

The present application is based on and claims priority of Japanese Patent Application No. 2021-057112 filed on Mar. 30, 2021. The entire disclosure of the above-identified application, including the specification, drawings and claims is incorporated herein by reference in its entirety.

FIELD

The present disclosure relates to a sound output device and a sound output method.

BACKGROUND

An active sound effects generating device disclosed in Patent Literature 1 has been known as an example of a sound output device that generates sound effects (simulated vehicle sound) based on a vehicle speed, which is one of drive states of a vehicle, and outputs the simulated vehicle sound in a vehicle cabin. The simulated vehicle sound thus output in the vehicle cabin allows a driver to perceive a running state of the vehicle with sounds. In other words, the driver can hear the simulated vehicle sound to feel a sense of driving. It has been known that the vehicle speed is calculated from a rotational speed of a wheel of the vehicle.

CITATION LIST

Patent Literature

PTL 1: Japanese Unexamined Patent Application Publication No. 2015-229403

SUMMARY

Technical Problem

However, there is a room for improvement in the sound output device in Patent Literature 1 described above.

Accordingly, the present disclosure provides a sound output device capable of providing further improvement.

Solution to Problem

In accordance with an aspect of the present disclosure, a sound output device provided in a vehicle includes: an obtainer that obtains a drive state of the vehicle; a generator that generates a simulated vehicle sound signal based on the drive state obtained; an outputter that outputs the simulated vehicle sound signal generated; a determiner that determines that a first wheel of the vehicle is free spinning when the drive state obtained suddenly changes; and a corrector that corrects the simulated vehicle sound signal generated based on the drive state that has suddenly changed, when the determiner determines that the first wheel is free spinning, wherein the outputter outputs the simulated vehicle sound signal corrected.

In accordance with another aspect of the present disclosure, a sound output method executed by a sound output device provided in a vehicle includes: obtaining a drive state of the vehicle; generating a simulated vehicle sound signal based on the drive state obtained; outputting the simulated vehicle sound signal generated; determining that a first wheel of the vehicle is free spinning when the drive state obtained suddenly changes; and correcting the simulated vehicle sound signal generated based on the drive state that has suddenly changed, when the determination is made that the first wheel is free spinning, wherein in the outputting, the simulated vehicle sound signal corrected in the correcting is outputted.

General or specific aspects of the present disclosure may be implemented to a system, a method, an integrated circuit, a computer program, a computer-readable recording medium such as a Compact Disc-Read Only Memory (CD-ROM), or any given combination thereof.

Advantageous Effects

A sound output device according to an aspect of the present disclosure can provide further improvement.

BRIEF DESCRIPTION OF DRAWINGS

These and other advantages and features will become apparent from the following description thereof taken in conjunction with the accompanying Drawings, by way of non-limiting examples of embodiments disclosed herein.

DESCRIPTION OF EMBODIMENT

Hereinafter, a certain exemplary embodiment will be described in detail with reference to the accompanying Drawings. The following embodiment is a general or specific example of the present disclosure. The numerical values, shapes, materials, elements, arrangement and connection configuration of the elements, steps, the order of the steps, etc., described in the following embodiment are merely examples, and are not intended to limit the present disclosure. Among elements in the following embodiment, those not described in any one of the independent claims indicating the broadest concept of the present disclosure are described as optional elements.

Note that the respective figures are schematic diagrams and are not necessarily precise illustrations. Additionally, components that are essentially the same share like reference signs in the figures. Accordingly, overlapping explanations thereof are omitted or simplified.

(Knowledge Underlying the Present Disclosure)

For example, when a road on which a vehicle is running is frozen, a wheel of the vehicle will be free spinning, that is, the wheel will be spinning idly, leading to an increase in the rotational speed of the wheel. In the sound output device disclosed in Patent Literature 1, the vehicle speed of the vehicle calculated from the rotational speed of the wheel increases rapidly as the rotational speed increases. As a result, the simulated vehicle sound generated based on the vehicle speed turns into a rapidly-varying uncomfortable sound, that is, an abnormal sound. When such an abnormal sound is generated, the driver of the vehicle may be surprised and driving safety may be compromised.

Accordingly, the present disclosure provides a sound output device or the like that helps allowing the driver to perceive the drive state of the vehicle and securing driving safety.

Embodiment

[Confirmation of Entire Vehicle 50 Including Sound Output Device 10]

In the embodiment, sound output device 10 provided in vehicle 50 will be described.

Figure 1:
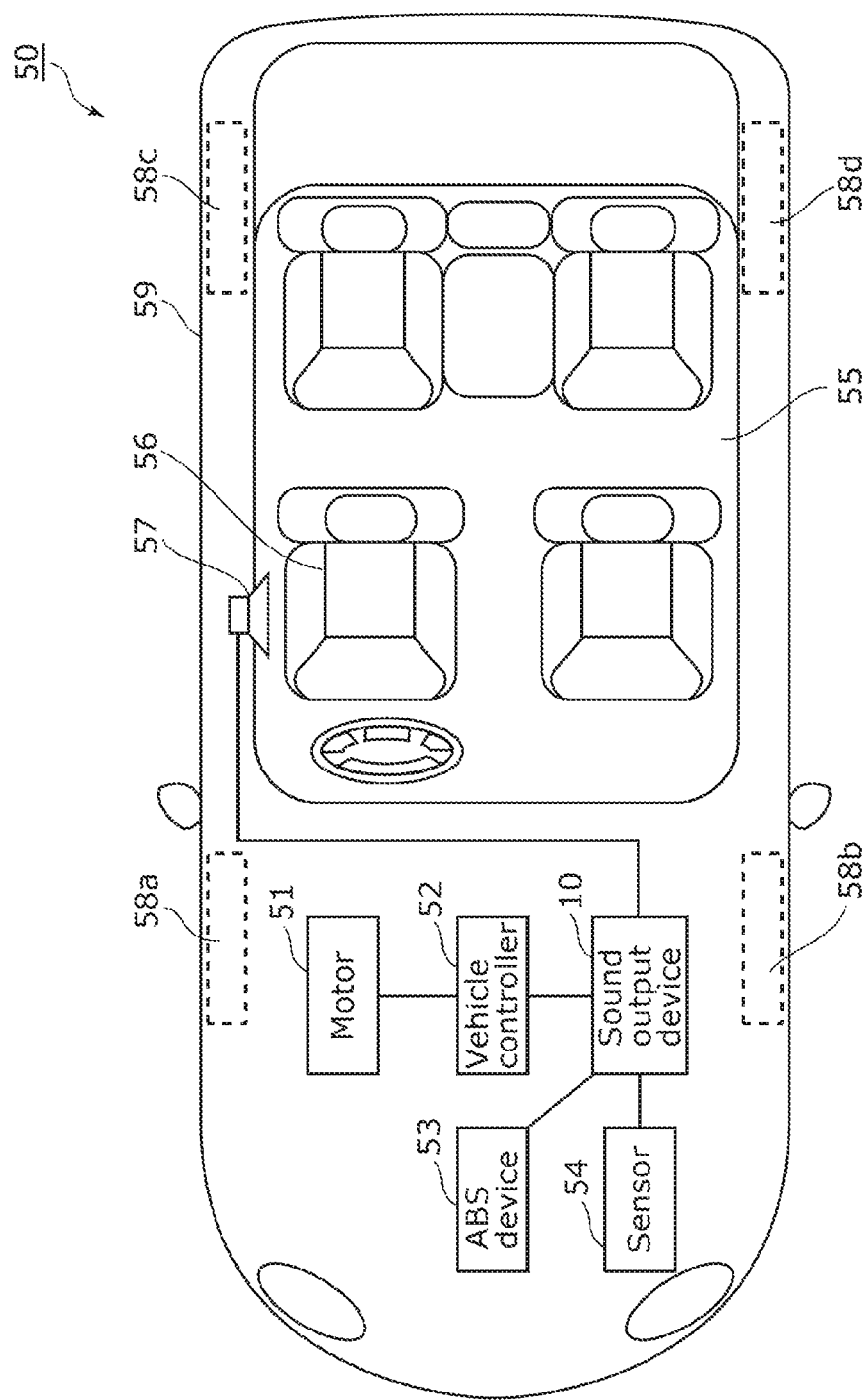
FIG. 1 is a schematic diagram of a vehicle including a sound output device according to an embodiment.

FIG. 1 is a schematic diagram of vehicle 50 including sound output device 10 according to the embodiment.

Vehicle 50 includes sound output device 10, motor 51, vehicle controller 52, ABS (Anti-lock Brake System) device 53, four wheels, sensor 54, speaker 57, and vehicle body 59. Vehicle 50 may include another motor (not illustrated) that is different and separate from motor 51. Specifically, vehicle 50 is, but not limited to, an automobile.

Motor 51 is a power source for driving the wheels to cause vehicle 50 to run and is an example of an electric motor. Four wheels of vehicle 50 includes first wheel 58a, second wheel 58b, third wheel 58c, and fourth wheel 58d. First wheel 58a is located to the right front of vehicle 50 and second wheel 58b is located to the left front of vehicle 50.

Here, motor 51 is directly connected to first wheel 58a for driving first wheel 58a. In other words, a direct-drive system is used in vehicle 50.

For example, motor 51 is located in a space separate from space 55 of the vehicle cabin among spaces in vehicle 50. Specifically, motor 51 is provided in a space formed in a hood of vehicle body 59.

While vehicle 50 is running, motor 51 has functions of generating power for accelerating vehicle 50 and obtaining regenerative energy generated when vehicle 50 is decelerated. Vehicle 50 is, for example, an EV (Electric Vehicle) that includes motor 51.

Vehicle controller 52 controls motor 51 to be driven based on operation by the driver of vehicle 50 or the like. Vehicle controller 52 is, for example, an ECU (Electronic Control Unit), and specifically implemented by a component such as a processor, a microcomputer, or a special purpose circuit. Vehicle controller 52 may be implemented by a combination of two or more of a processor, a microcomputer, and a special purpose circuit.

Vehicle controller 52 calculates the vehicle speed of vehicle 50 from the rotational speed of first wheel 58a directly connected to motor 51. Vehicle controller 52 also calculates the acceleration of vehicle 50 from the rotational speed of first wheel 58a. Hereinafter, the vehicle speed thus calculated and the acceleration thus calculated are designated as a calculated vehicle speed and a calculated acceleration, respectively. Vehicle controller 52 outputs calculated vehicle speed information indicative of the calculated vehicle speed and calculated acceleration information indicative of the calculated acceleration.

Further, vehicle controller 52 controls another motor that is directly connected to second wheel 58b to be driven. Vehicle controller 52 calculates a difference between the rotational speed of first wheel 58a and the rotational speed of second wheel 58b. Hereinafter, the difference between the rotational speed of first wheel 58a and the rotational speed of second wheel 58b is designated as a rotational speed difference. Vehicle controller 52 outputs difference information indicative of the rotational speed difference.

Further, vehicle controller 52 outputs motor information indicative of the torque and the rotational speed of motor 51 (that is, the electric motor).

ABS device 53 is a device for preventing occurrence of skid caused by any of first to fourth wheels 58a to 58d locking up. ABS device 53 outputs ABS information indicative of operation information that represents operation of ABS device 53. The operation information according to the embodiment is information on free spinning of first wheel 58a.

Sensor 54 is a device for detecting information on travelling of vehicle 50. For example, sensor 54 includes a speed sensor for detecting a vehicle speed, which is the travelling speed of vehicle 50, and an acceleration sensor for detecting the acceleration of vehicle 50. Hereinafter, the vehicle speed and the acceleration, which are detected by sensor 54, are designated as a detected vehicle speed and a detected acceleration, respectively. The detected vehicle speed and the detected acceleration are the actual vehicle speed and acceleration of vehicle 50. Sensor 54 outputs detected vehicle speed information indicative of the detected vehicle speed thus detected and detected acceleration information indicative of the detected acceleration.

The calculated vehicle speed, the calculated acceleration, the rotational speed difference, the torque of motor 51, the rotational speed of motor 51, the operation information, the detected vehicle speed, and the detected acceleration described above are examples of drive information of vehicle 50. The calculated vehicle speed information, the calculated acceleration information, the difference information, the motor information, the ABS information, the detected vehicle speed information, and the detected acceleration information, in which the pieces of drive information are indicated, may be output from vehicle controller 52, ABS device 53, and sensor 54 through an in-vehicle network, for example. The in-vehicle network refers to a network such as CAN (Controller Area Network) or Ethernet®, for example.

Speaker 57 outputs a simulated vehicle sound corresponding to a simulated vehicle sound signal output from sound output device 10. Speaker 57 is disposed in, for example, a wall (door) on the side of the driver's seat in vehicle 50, and outputs a simulated vehicle sound that is adjusted to be heard appropriately by the driver at predetermined position 56 near the driver's seat. Predetermined position 56 is, for example, a position where an occupant (driver) is seated in vehicle 50.

In the example in FIG. 1, although speaker 57 is disposed in the wall on the side of the driver's seat, it is not a limitation and speaker 57 may be disposed in any other position. Further, the simulated vehicle sound may be output from a plurality of speakers instead of one speaker 57. The plurality of speakers may be disposed in any positions in vehicle body 59.

Vehicle body 59 is a structure made up of a chassis, a body, and the like of vehicle 50. Vehicle body 59 forms space 55 (an interior space of the vehicle cabin) in vehicle 50 in which speaker 57 is located.

[Configuration of Sound Output Device]

Figure 2:
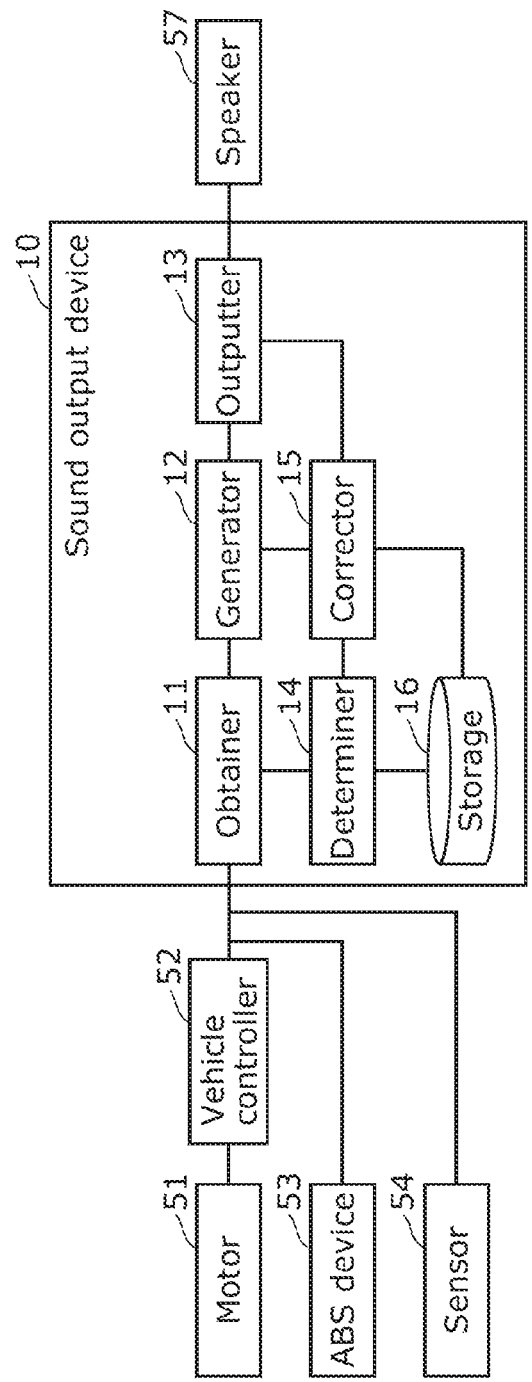
FIG. 2 is a functional block diagram in connection with the sound output device according to the embodiment.

The configuration and basic operation of sound output device 10 will now be described with reference to FIG. 2 in addition to FIG. 1. FIG. 2 is a functional block diagram in connection with sound output device 10 according to the embodiment.

Sound output device 10 is a device for generating a signal corresponding to a simulated running sound for causing the driver to feel a sense of driving. The running sound is designated as a simulated vehicle sound. More specifically, sound output device 10 generates and outputs a simulated vehicle sound signal corresponding to the simulated vehicle sound.

Sound output device 10 generates the simulated vehicle sound signal based on a drive state indicative of a state related to driving of vehicle 50. In other words, the drive state refers to a state related to travelling of vehicle 50. Sound output device 10 outputs the generated simulated vehicle sound signal to speaker 57. In this way, speaker 57 outputs a simulated vehicle sound corresponding to the simulated vehicle sound signal, so that the driver can perceive the drive state of vehicle 50.

The simulated vehicle sound is a simulated sound heard by the driver, for example, when a vehicle (engine vehicle) that relies on an engine as a power source is running. In particular, when the driver is an experienced driver of an engine vehicle, the simulated vehicle sound output in response to the drive state naturally causes the driver of vehicle 50 to perceive the drive state of vehicle 50.

As illustrated in FIG. 2, sound output device 10 includes obtainer 11, generator 12, outputter 13, determiner 14, corrector 15, and storage 16.

[Obtainer 11]

Obtainer 11 sequentially obtains the drive state of vehicle 50. As described above, obtainer 11 obtains the calculated vehicle speed information, the calculated acceleration information, the difference information, the motor information, the ABS information, the detected vehicle speed information, and the detected acceleration information output from vehicle controller 52, ABS device 53, and sensor 54. Here, obtainer 11 obtains, as the drive state, the calculated vehicle speed, the calculated acceleration, the rotational speed difference, the torque of motor 51, the rotational speed of motor 51, the operation information, the detected vehicle speed, and the detected acceleration. The drive state obtained by obtainer 11 may include an accelerator pedal opening of vehicle 50 or the like.

The drive state may be, for example, an indicator value indicated by consecutive numeral values, may be a signal indicating whether or not there is predetermined information, or may be any other indicators correlated with the drive state.

Obtainer 11 is, for example, a communication module (communication circuit) that communicates with vehicle controller 52, ABS device 53, and sensor 54 through communication conforming to the CAN standard to obtain information; however, obtainer 11 is not limited thereto and may be any communication module that conforms to any other communication standards.

[Generator 12]

Generator 12 generates the simulated vehicle sound signal based on the drive state obtained by obtainer 11. The simulated vehicle sound signal is a signal corresponding to a sound with which the driver of vehicle 50 can naturally perceive the drive state of vehicle 50. Generator 12 may also generate the simulated vehicle sound signal based on the calculated vehicle speed, the accelerator pedal opening, and the like among the pieces of drive information. Generator 12 generates the simulated vehicle sound signal based on a table that indicates correspondence between the obtained drive state/drive states of vehicle 50 stored in storage 16 and information of the simulated vehicle sound signal. Generator 12 also adjusts gains on a frequency basis such that the level of simulated vehicle sound signal has predetermined frequency characteristics. The predetermined frequency characteristics refers to frequency characteristics depending on the obtained drive state.

[Outputter 13]

Outputter 13 outputs the simulated vehicle sound signal generated by generator 12 to speaker 57. Outputter 13 also outputs the simulated vehicle sound signal corrected by corrector 15 to speaker 57.

[Determiner 14]

Determiner 14 determines that first wheel 58a of vehicle 50 is free spinning when the drive state obtained by obtainer 11 suddenly changes. The free spinning of first wheel 58a means that first wheel 58a is spinning idly. More specifically, the free spinning means that vehicle 50 including first wheel 58a only advances a distance less than the length equivalent to one turn of first wheel 58a even when first wheel 58a makes one complete rotation. When the free spinning occurs, the rotational speed of first wheel 58a rapidly increases.

The free spinning is also likely to occur when vehicle 50 runs through a puddle of water or runs over an obstacle. In other words, conditions of a road surface on which vehicle 50 is running affects likelihood of the free spinning.

The sudden change in the drive state will be outlined with reference to 3 examples.

As an example, the sudden change means that the drive state at a first time point exceeds a predefined threshold of the drive state for vehicle 50.

As another example, the sudden change means that the drive state at the first time point changes to or above a predetermined value or a predetermined rate with respect to the drive state in a first predetermined period prior to the first time point.

As another example, when the drive state includes predetermined information such as operation information, the sudden change means that there is no predetermined information in the first predetermined period and there is predetermined information at the first time point.

In this way, when the drive state obtained suddenly changes, determiner 14 determines that first wheel 58a is free spinning at the first time point.

[Corrector 15]

Corrector 15 corrects the simulated vehicle sound signal generated based on the drive state in which there is a sudden change when determiner 14 determines that first wheel 58a is free spinning. In the embodiment, corrector 15 corrects the simulated vehicle sound signal such that the driver is less likely to feel the simulated vehicle sound corresponding to the simulated vehicle sound signal as an abnormal sound. As described above, the abnormal sound is a sound that is caused by a rapidly varying simulated vehicle sound signal and is uncomfortable to the driver.

The above-described processing parts in sound output device 10 are implemented, for example, by, but not limited to, a processor such as a DSP (Digital Signal Processor). The above-described processing parts in sound output device 10 may be implemented by a microcomputer or a special purpose circuit, or may be implemented by a combination of two or more of a processor, a microcomputer, and a special purpose circuit.

[Storage 16]

Storage 16 is a storage device that stores a program or the like that is to be executed by generator 12, determiner 14, and corrector 15. Storage 16 may be implemented by a non-volatile memory or any other storages.

[Operation of Sound Output Device 10]

Figure 3:
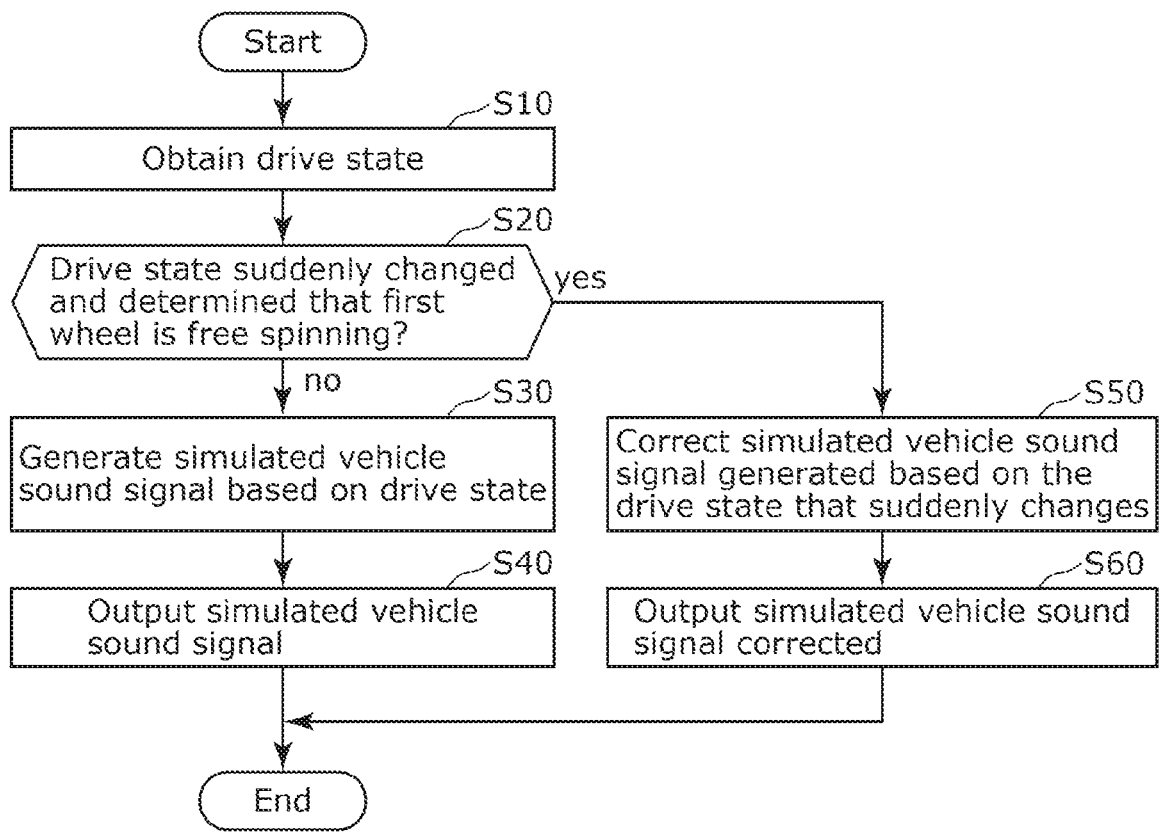
FIG. 3 is a flowchart of an exemplary operation of the sound output device according to the embodiment.

Exemplary operation of sound output device 10 will now be outlined. FIG. 3 is a flowchart of an exemplary operation of sound output device 10 according to the embodiment.

First, obtainer 11 obtains the drive state (S10). The step S10 corresponds to the obtaining step.

Next, when the drive state obtained by obtainer 11 suddenly changes, determiner 14 determines that first wheel 58a of vehicle 50 is free spinning (S20). The step S20 is the determining step.

When the drive state does not suddenly change, that is, first wheel 58a is not free spinning (no in step S20), generator 12 generates the simulated vehicle sound signal based on the drive state obtained by obtainer 11 (S30). More specifically, generator 12 generates the simulated vehicle sound signal based on the drive state obtained that does not suddenly change. The step S30 corresponds to the generating step.

Further, outputter 13 outputs the simulated vehicle sound signal generated by generator 12 (S40). The step S40 corresponds to the outputting step. Subsequently, the simulated vehicle sound corresponding to the simulated vehicle sound signal is output from speaker 57.

In the case described above, the simulated vehicle sound signal is generated and output based on the drive state that does not suddenly change. In this way, the driver can perceive the drive state of vehicle 50.

Here, when the drive state suddenly changes, that is, first wheel 58a is free spinning (yes in step S20), corrector 15 corrects the simulated vehicle sound signal generated based on the drive state that suddenly changes, which is obtained by obtainer 11 (S50). Corrector 15 corrects the simulated vehicle sound such that the driver is less likely to feel the simulated vehicle sound corresponding to the simulated vehicle sound signal as an abnormal sound. The step S50 corresponds to the correcting step.

Further, outputter 13 outputs the simulated vehicle sound signal corrected by corrector 15 (S60). Subsequently, the corrected simulated vehicle sound corresponding to the simulated vehicle sound signal is output from speaker 57.

Accordingly, in the operation described above, when the drive state of vehicle 50 does not suddenly change, outputter 13 outputs the simulated vehicle sound signal with which the driver perceives the drive state of vehicle 50. Further, when the drive state of vehicle 50 suddenly changes, that is, first wheel 58a of vehicle 50 is free spinning, corrector 15 makes a correction such that the driver is less likely to feel the simulated vehicle sound corresponding to the simulated vehicle sound signal as an abnormal sound. Consequently, an abnormal sound is prevented from being output from outputter 13, so that driver is less likely to be surprised. Accordingly, sound output device 10 that helps allowing the driver to perceive the drive state of vehicle 50 and securing driving safety is provided.

Hereinafter, details of processing performed by determiner 14 at the step S20, and details of processing performed by corrector 15 at the step S50 will be described.

[Details of Processing Performed by Determiner 14]

First, details of processing performed by determiner 14 will be described with reference to 7 examples (first example to seventh example).

First Example

In the first example, the drive state includes the calculated vehicle speed and the calculated acceleration of vehicle 50. In the first example, at the step S20 illustrated in FIG. 3, determiner 14 determines that first wheel 58a is free spinning when at least one of the calculated vehicle speed and the calculated acceleration suddenly changes. The calculated vehicle speed of vehicle 50 is a travelling speed of vehicle 50 calculated from the rotational speed of first wheel 58a. The calculated acceleration of vehicle 50 is an acceleration of vehicle 50 calculated from the rotational speed of first wheel 58a.

Here, the sudden change in the calculated vehicle speed and the sudden change in the calculated acceleration will be described in detail.

First, the sudden change in the calculated vehicle speed will be described.

The sudden change in the calculated vehicle speed means that the calculated vehicle speed at the first time point changes to or above a predetermined value or a predetermined rate with respect to an average of the calculated vehicle speed in the first predetermined period prior to the first time point.

The first predetermined period is, for example, a period from a second time point, which is prior to the first time point, to a point before the first time point excluding the first time point. In other words, the first predetermined period is a period starting at the second time point and ending before the first time point. The first predetermined period may be, for example, 10 minutes or less, 1 minutes or less, 30 seconds or less, or 10 seconds or less. The second time point is a time point a predetermined time before the first time point and the predetermined time may be 10 minutes or less, 1 minutes or less, 30 seconds or less, or 10 seconds or less.

The predetermined value may be, for example, 50 km/h or less, 30 km/h or less, or 10 km/h or less. The predetermined rate may be, for example, 80% or less, 60% or less, or 40% or less of the average of the calculated vehicle speed in the first predetermined period. Accordingly, the sudden change in the calculated vehicle speed means that the calculated vehicle speed at the first time point exceeds a threshold of the calculated vehicle speed defined according to the predetermined value or the predetermined rate.

Figure 4:
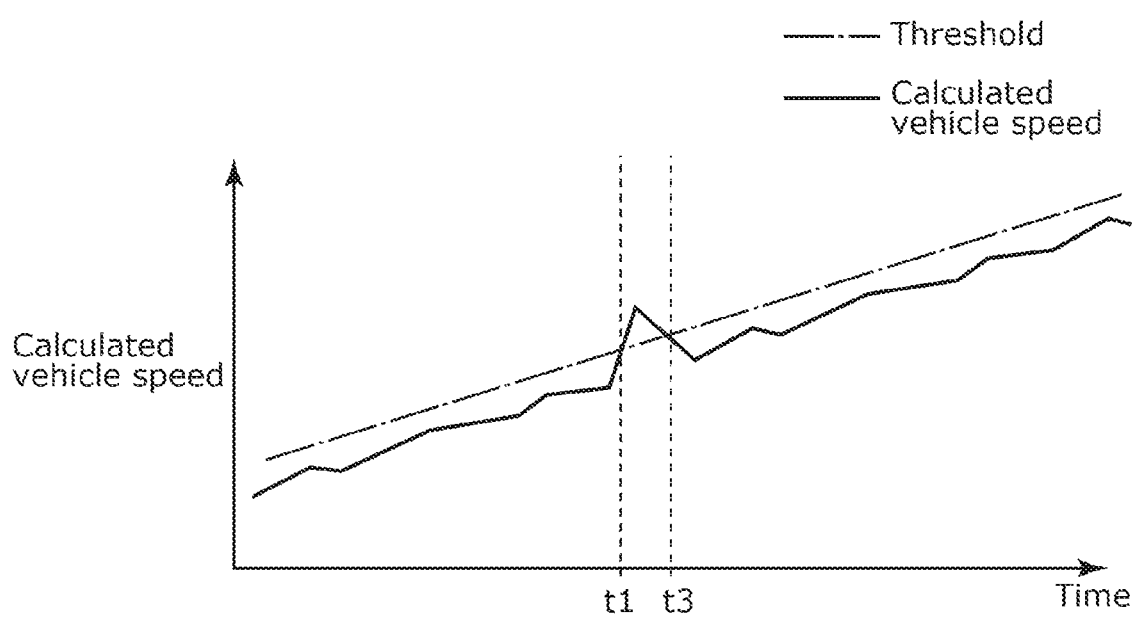
FIG. 4 is a schematic diagram for describing details of processing performed by a determiner by using a calculated vehicle speed in a first example according to the embodiment.

FIG. 4 is a schematic diagram for describing details of processing performed by determiner 14 by using the calculated vehicle speed in a first example according to the embodiment. More specifically, FIG. 4 illustrates a relationship among the calculated vehicle speed when vehicle 50 is running, the threshold of the calculated vehicle speed, and the elapsed time. The threshold of the calculated vehicle speed is a value that is 50 km/h larger than the average of the calculated vehicle speed in the first predetermined period.

When free spinning of first wheel 58a occurs, the rotational speed of first wheel 58a increases, and therefore the calculated vehicle speed calculated according to the rotational speed increases. Accordingly, in the first example, determiner 14 may determine that first wheel 58a is free spinning when the calculated vehicle speed increases at a first time point t1 to such a degree that the threshold of the calculated vehicle speed is exceeded, that is, when the calculated vehicle speed suddenly changes.

Further, at a third time point t3 after the first time point t1, determiner 14 may determine that the free spinning of first wheel 58a ceases when the calculated vehicle speed falls below the threshold of the calculated vehicle speed.

Next, the sudden change in the calculated acceleration will be described.

The sudden change in the calculated acceleration means that the calculated acceleration at the first time point t1 exceeds the threshold of the predefined calculated acceleration for vehicle 50.

Figure 5:
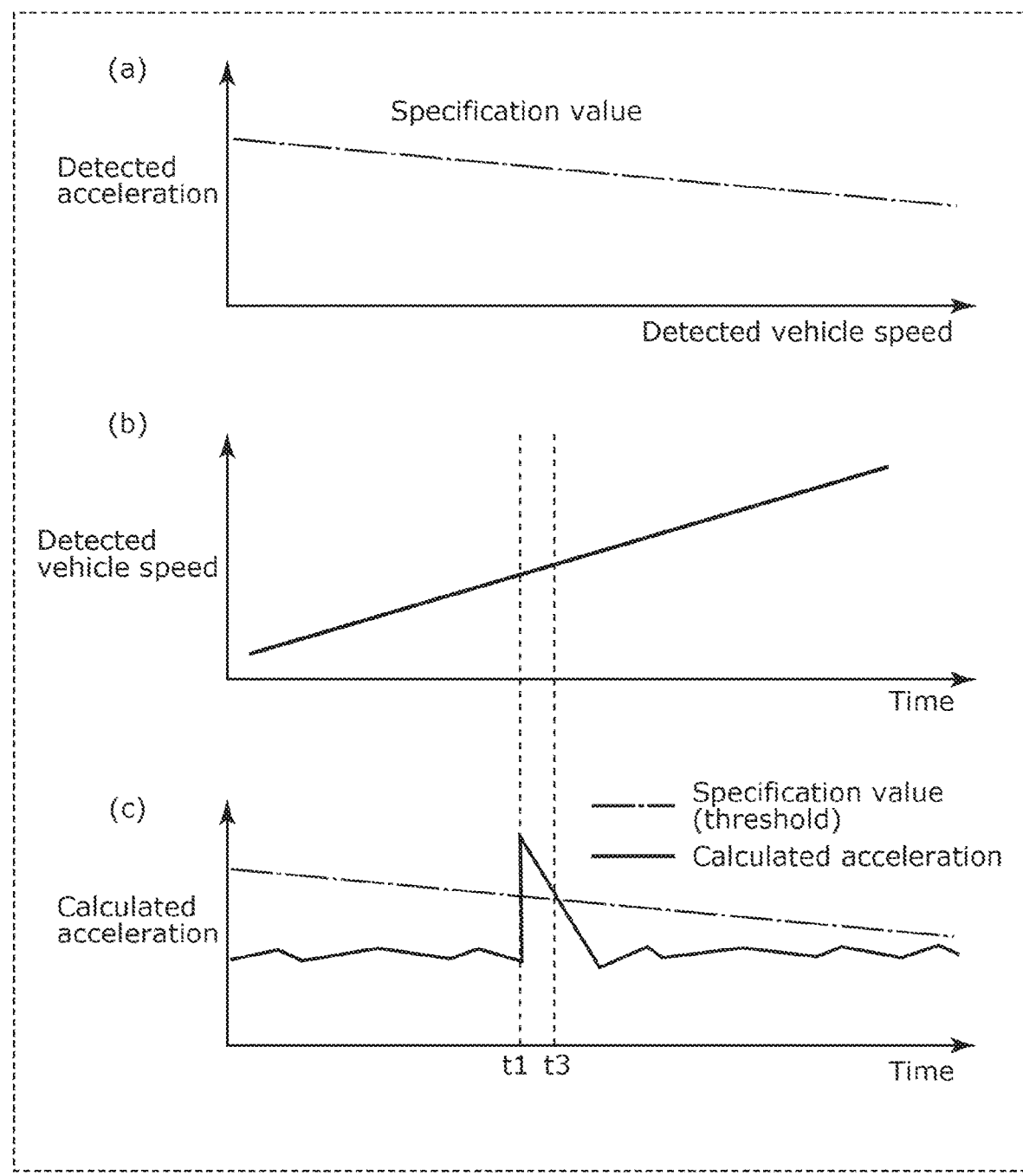
FIG. 5 is a schematic diagram for describing details of processing performed by the determiner by using a calculated acceleration in the first example according to the embodiment.

FIG. 5 is a schematic diagram for describing details of processing performed by determiner 14 by using the calculated acceleration in the first example according to the embodiment. More specifically, the graph (a) in FIG. 5 illustrates a specification value for a detected acceleration corresponding to a detected speed. As illustrated in the graph (a) in FIG. 5, an upper limit value of the detected acceleration is defined in advance as the specification value depending on the detected speed for vehicle 50. The upper limit value is stored in storage 16. In the example, the upper limit value corresponds to the threshold of the calculated acceleration. Further, the graph (b) in FIG. 5 illustrates a relationship between a detected vehicle speed of vehicle 50 and the elapsed time, and the graph (c) in FIG. 5 illustrates a relationship among the calculated acceleration of vehicle 50, the threshold of the calculated acceleration, and the elapsed time. In graphs (b) and (c) in FIG. 5, the same elapsed time is illustrated.

When free spinning of first wheel 58a occurs, the rotational speed of first wheel 58a increases, and therefore the calculated acceleration calculated according to the rotational speed increases. Accordingly, in the first example, determiner 14 may determine that first wheel 58a is free spinning when the calculated acceleration increases at a first time point t1 to such a degree that the threshold of the calculated acceleration is exceeded, that is, when the calculated vehicle speed suddenly changes.

As described above, in the first example, at the step S20 illustrated in FIG. 3, determiner 14 determines that first wheel 58a is free spinning when at least one of the calculated vehicle speed and the calculated acceleration suddenly changes. In other words, determiner 14 may determine that first wheel 58a is free spinning when the calculated vehicle speed suddenly changes or may determine that first wheel 58a is free spinning when the calculated acceleration suddenly changes.

Further, at a third time point t3 after the first time point t1, determiner 14 may determine that the free spinning of first wheel 58a ceases when the calculated acceleration falls below the threshold of the calculated acceleration.

To summarize the first example, the drive state includes the calculated vehicle speed, and determiner 14 determines that the first wheel is free spinning when the calculated vehicle speed suddenly changes. Similarly, in the first example, the drive state includes the calculated acceleration, and determiner 14 determines that the first wheel is free spinning when the calculated acceleration suddenly changes.

In this way, determiner 14 can more accurately determine that the first wheel is free spinning.

Second Example

In the second example, the drive state includes a rotational speed difference, which is a difference between the rotational speed of first wheel 58a and the rotational speed of second wheel 58b. In the second example, at the step S20 illustrated in FIG. 3, determiner 14 determines that first wheel 58a is free spinning when the rotational speed difference suddenly changes.

Here, the sudden change in the rotational speed difference will be described.

The sudden change in the rotational speed difference means that the rotational speed difference at the first time point t1 changes to or above a predetermined value or a predetermined rate with respect to an average of the rotational speed difference in the first predetermined period.

The first predetermined period in the second example is the same as the first predetermined period in the first example.

The predetermined value may be, for example, 100 rpm or less, 50 rpm or less, or 30 rpm or less. The predetermined rate may be, for example, 80% or less, 60% or less, or 40% or less of the average of the rotational speed difference in the first predetermined period. Accordingly, the sudden change means that the rotational speed difference in the first time point t1 exceeds the threshold of the rotational speed difference defined according to the predetermined value or the predetermined rate.

Figure 6:
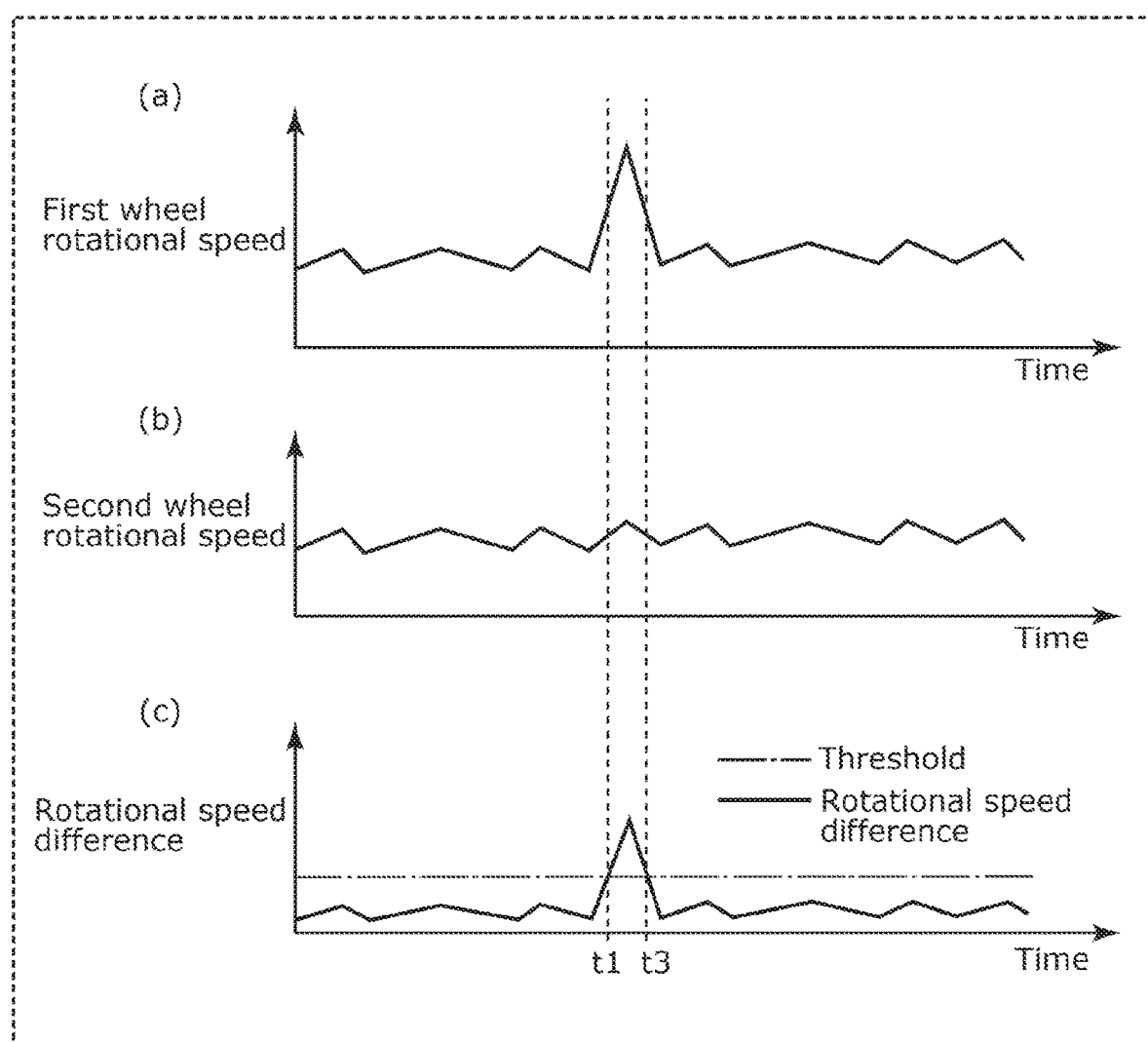
FIG. 6 is a schematic diagram for describing details of processing performed by the determiner by using a rotational speed difference in a second example according to the embodiment.

FIG. 6 is a schematic diagram for describing details of processing performed by determiner 14 by using the rotational speed difference in the second example according to the embodiment. More specifically, the graph (a) in FIG. 6 illustrates a relationship between the rotational speed of first wheel 58a when vehicle 50 is running and the elapsed time. The graph (b) in FIG. 6 illustrates a relationship between the rotational speed of second wheel 58b when vehicle 50 is running and the elapsed time. The graph (c) in FIG. 6 illustrates a relationship among the rotational speed difference when vehicle 50 is running, the threshold of the rotational speed difference, and the elapsed time. In graphs (a), (b), and (c) in FIG. 6, the same elapsed time is illustrated. The threshold of the rotational speed difference is a value that is 100 rpm larger than the average of the rotational speed difference in the first predetermined period.

When free spinning of first wheel 58a occurs, the rotational speed of first wheel 58a increases. The rotational speed of second wheel 58b that is not free spinning is kept constant. Accordingly, in the second example, determiner 14 may determine that first wheel 58a is free spinning when the rotational speed difference increases at a first time point t1 to such a degree that the threshold of the rotational speed difference is exceeded, that is, when the rotational speed difference suddenly changes.

Further, at a third time point t3 after the first time point t1, determiner 14 may determine that the free spinning of first wheel 58a ceases when the rotational speed difference falls below the threshold of the rotational speed difference.

To summarize the second example, the drive state includes the rotational speed difference, and determiner 14 determines that the first wheel is free spinning when the rotational speed difference suddenly changes.

In this way, determiner 14 can more accurately determine that the first wheel is free spinning.

Third Example

In the third example, the drive state includes a torque of motor 51, which is an electric motor. The torque of motor 51 may be considered as a load on motor 51. In the third example, at the step S20 illustrated in FIG. 3, determiner 14 determines that first wheel 58a is free spinning when the torque of motor 51 suddenly changes.

Here, the sudden change in the torque of motor 51 will be described.

The sudden change in the torque of motor 51 means that the torque of motor 51 at the first time point t1 changes to or above a predetermined value or a predetermined rate with respect to an average of the torque of motor 51 in the first predetermined period.

The first predetermined period in the third example is the same as the first predetermined period in the first example.

The predetermined value may be, for example, 100 Nm or less, 50 Nm or less, or 30 Nm or less. The predetermined rate may be, for example, 80% or less, 60% or less, or 40% or less of the average of the torque of motor 51 in the first predetermined period. Accordingly, the sudden change means that the torque of motor 51 in the first time point t1 falls below a threshold of the torque of motor defined according to the predetermined value or the predetermined rate.

Figure 7:
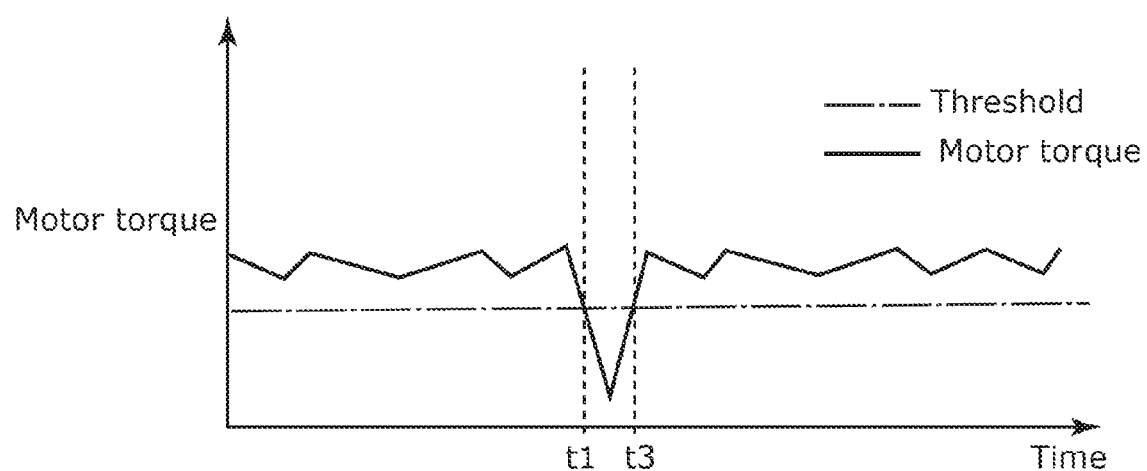
FIG. 7 is a schematic diagram for describing details of processing performed by the determiner by using a torque of a motor in a third example according to the embodiment.

FIG. 7 is a schematic diagram for describing details of processing performed by determiner 14 by using the torque of motor 51 in the third example according to the embodiment. More specifically, FIG. 7 illustrates a relationship among the torque of motor 51 when vehicle 50 is running, the threshold of the torque of motor 51, and the elapsed time. The threshold of the torque of motor 51 is a value that is 100 Nm smaller than the average of the torque of motor 51 in the first predetermined period.

Here, the state in which first wheel 58a is free spinning is the state in which the friction between first wheel 58a and the road surface is significantly small. In this state, the torque of motor 51, that is, the load on motor 51 decreases.

Accordingly, in the third example, determiner 14 may determine that first wheel 58a is free spinning when the torque of motor 51 decreases at a first time point t1 to such a degree that the torque falls below the threshold of the torque of motor 51, that is, when the rotational speed difference suddenly changes.

Further, at a third time point t3 after the first time point t1, determiner 14 may determine that the free spinning of first wheel 58a ceases when the torque of motor 51 exceeds the threshold of the torque of motor 51.

To summarize the third example, the drive state includes the torque of motor 51, and determiner 14 determines that the first wheel is free spinning when the torque of motor 51 suddenly changes.

In this way, determiner 14 can more accurately determine that the first wheel is free spinning.

Fourth Example

In the fourth example, the drive state includes a rotational speed of motor 51, which is an electric motor. In the fourth example, at the step S20 illustrated in FIG. 3, determiner 14 determines that first wheel 58a is free spinning when the rotational speed of motor 51 suddenly changes.

Here, the sudden change in the rotational speed of motor 51 will be described.

The sudden change in the rotational speed of motor 51 means that the rotational speed of motor 51 at the first time point t1 changes to or above a predetermined value or a predetermined rate with respect to an average of the rotational speed of motor 51 in the first predetermined period.

The first predetermined period in the fourth example is the same as the first predetermined period in the first example.

The predetermined value may be, for example, 100 rpm or less, 50 rpm or less, or 30 rpm or less. The predetermined rate may be, for example, 80% or less, 60% or less, or 40% or less of the average of the rotational speed of motor 51 in the first predetermined period. Accordingly, the sudden change means that the rotational speed of motor 51 at the first time point t1 exceeds the threshold of the rotational speed of motor 51 defined according to the predetermined value or the predetermined rate.

Figure 8:
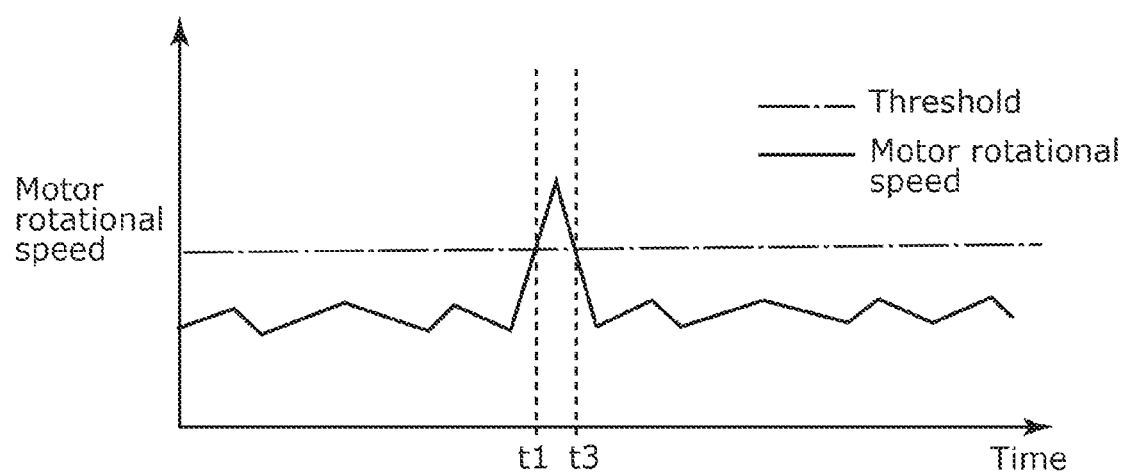
FIG. 8 is a schematic diagram for describing details of processing performed by the determiner by using a rotational speed of a motor in a fourth example according to the embodiment.

FIG. 8 is a schematic diagram for describing details of processing performed by determiner 14 by using the rotational speed of motor 51 in the fourth example according to the embodiment. More specifically, FIG. 8 illustrates a relationship among the rotational speed of motor 51 when vehicle 50 is running, the threshold of the rotational speed of motor 51, and the elapsed time. The threshold of the rotational speed of motor 51 is a value that is 100 rpm larger than the average of the rotational speed of motor 51.

Here, first wheel 58a is directly connected to motor 51, and therefore when the rotational speed of first wheel 58a increases, the rotational speed of motor 51 also increases. Accordingly, in the fourth example, determiner 14 may determine that first wheel 58a is free spinning when the rotational speed of motor 51 increases at a first time point t1 to such a degree that the threshold of the rotational speed of motor 51 is exceeded, that is, when the rotational speed of motor 51 suddenly changes.

Further, at a third time point t3 after the first time point t1, determiner 14 may determine that the free spinning of first wheel 58a ceases when the rotational speed of motor 51 falls below the threshold of the rotational speed of motor 51.

To summarize the fourth example, the drive state includes the rotational speed of motor 51, and determiner 14 determines that the first wheel is free spinning when the rotational speed of motor 51 suddenly changes.

In this way, determiner 14 can more accurately determine that the first wheel is free spinning.

Fifth Example

In the fifth example, the drive state includes a calculated vehicle speed and a detected acceleration of vehicle 50. The detected acceleration is a detected acceleration in a forward or backward direction of vehicle 50, that is, a forward or backward travelling direction of vehicle 50. In the fifth example, at the step S20 illustrated in FIG. 3, determiner 14 determines that the first wheel is free spinning when the calculated vehicle speed suddenly changes and the detected acceleration in the forward or backward direction does not suddenly change. In the fifth example, the detected acceleration in the forward or backward direction is designated as the detected acceleration (forward or backward).

Here, the sudden change in the calculated vehicle speed in the fifth example is the same as the sudden change in the calculated vehicle speed in the first example.

The sudden change in the detected acceleration (forward or backward) will be described.

The sudden change in the detected acceleration (forward or backward) means that the detected acceleration (forward or backward) at the first time point t1 changes to or above a predetermined value or a predetermined rate with respect to an average of the detected acceleration (forward or backward) in the first predetermined period.

The first predetermined period in the fifth example is the same as the first predetermined period in the first example.

The predetermined value may be, for example, 30 km/h/s or less, 20 km/h/s or less, or 10 km/h/s or less. The predetermined rate may be, for example, 80% or less, 60% or less, or 40% or less of the average of the detected acceleration (forward or backward) in the first predetermined period. Accordingly, the sudden change means that the detected acceleration (forward or backward) at the first time point t1 exceeds the threshold of the detected acceleration (forward or backward) defined according to the predetermined value or the predetermined rate.

Figure 9:
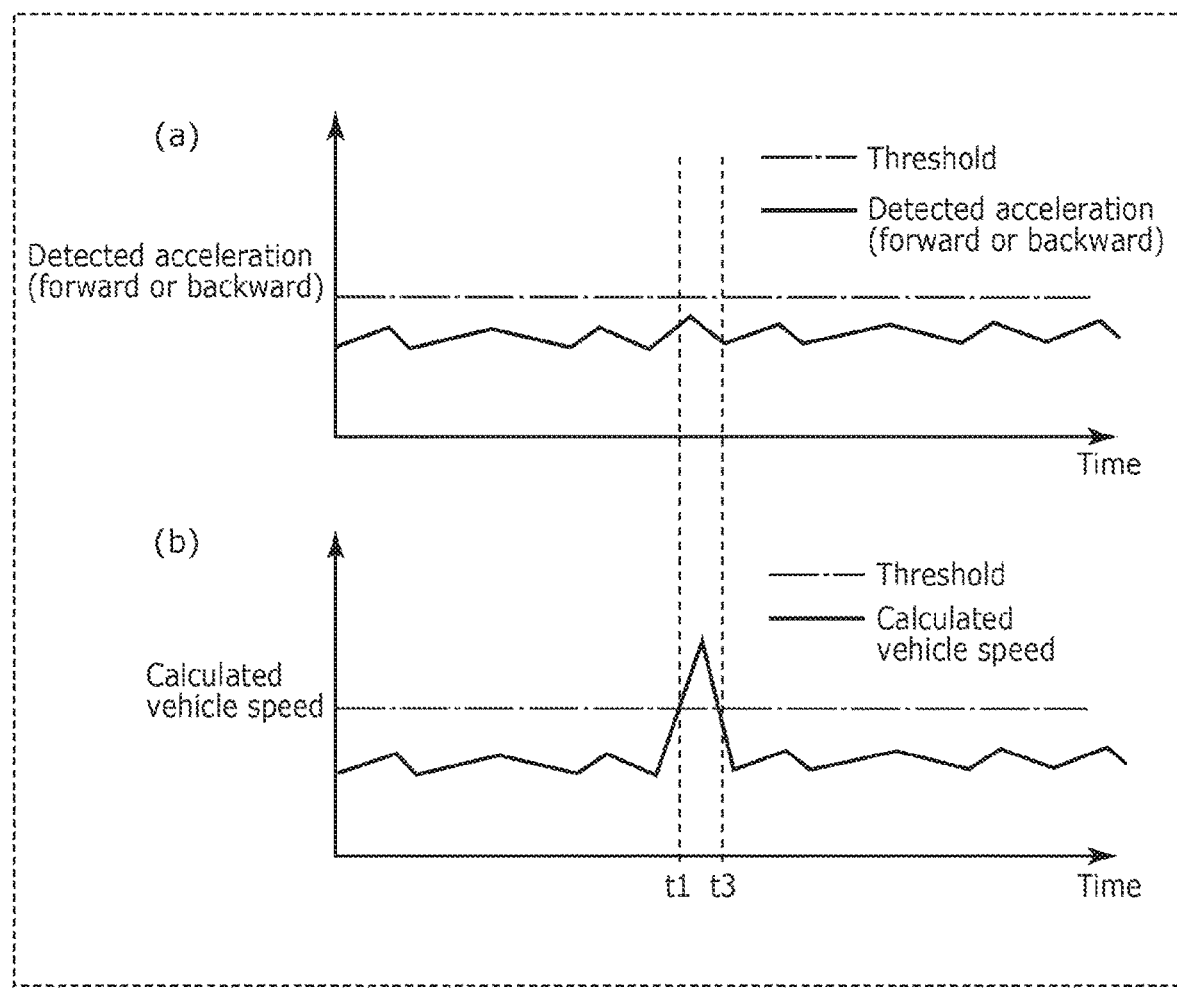
FIG. 9 is a schematic diagram for describing details of processing performed by the determiner by using a calculated vehicle speed and a detected acceleration in a fifth example according to the embodiment.

FIG. 9 is a schematic diagram for describing details of processing performed by determiner 14 by using the calculated vehicle speed and the detected acceleration (forward or backward) in the fifth example according to the embodiment. More specifically, the graph (a) in FIG. 9 illustrates a relationship among the detected acceleration (forward or backward) of vehicle 50, the threshold of the detected acceleration (forward or backward), and the elapsed time, and the graph (b) in FIG. 9 illustrates a relationship among the calculated vehicle speed of vehicle 50, the threshold of the calculated vehicle speed, and the elapsed time. In the graphs (a) and (b) in FIG. 9, the same elapsed time is illustrated. The threshold of the detected acceleration (forward or backward) is a value that is 30 km/h/s or less larger than the average of the detected acceleration (forward or backward) in the first predetermined period.

As described above, the detected acceleration (forward or backward) is an actual acceleration in the forward or backward direction of vehicle 50. Accordingly, even when the rotational speed of first wheel 58a increases at the first time point t1 illustrated in FIG. 9 because first wheel 58a is free spinning, the detected acceleration (forward or backward) does not vary significantly, and the detected acceleration (forward or backward) does not reach the threshold of the detected acceleration (forward or backward). Accordingly, determiner 14 may determine that first wheel 58a is free spinning when the calculated vehicle speed suddenly changes as illustrated in the first example and the detected acceleration (forward or backward) does not suddenly change, that is, the detected acceleration (forward or backward) does not reach the threshold of the detected acceleration (forward or backward).

To summarize the fifth example, the drive state includes the calculated vehicle speed and the detected acceleration (forward or backward), and determiner 14 determines that the first wheel is free spinning when the calculated vehicle speed suddenly changes and the detected acceleration (forward or backward) in the forward or backward direction does not suddenly change.

In this way, determiner 14 can more accurately determine that the first wheel is free spinning.

Sixth Example

In the sixth example, the drive state includes operation information output by ABS device 53. The operation information is information on free spinning of first wheel 58a. In the sixth example, at the step S20 illustrated in FIG. 3, determiner 14 determines that first wheel 58a is free spinning when the operation information of ABS device 53 suddenly changes.

In the sixth example, ABS device 53 obtains drive states other than the operation information and determines whether or not the first wheel is free spinning based on the drive states. When it is determined that the first wheel is free spinning, ABS device 53 outputs ABS information indicative of the operation information to sound output device 10. In other words, when it is determined that the first wheel is not free spinning, ABS device 53 does not output the ABS information indicative of the operation information to sound output device 10.

Here, the sudden change in the operation information will be described.

The sudden change in the operation information means that there is no operation information in the first predetermined period and there is the operation information at the first time point t1. In other words, the sudden change in the operation information means that sound output device 10 does not obtain the operation information in the first predetermined period and obtains the operation information at the first time point t1.

The first predetermined period in the sixth example is the same as the first predetermined period in the first example.

Figure 10:
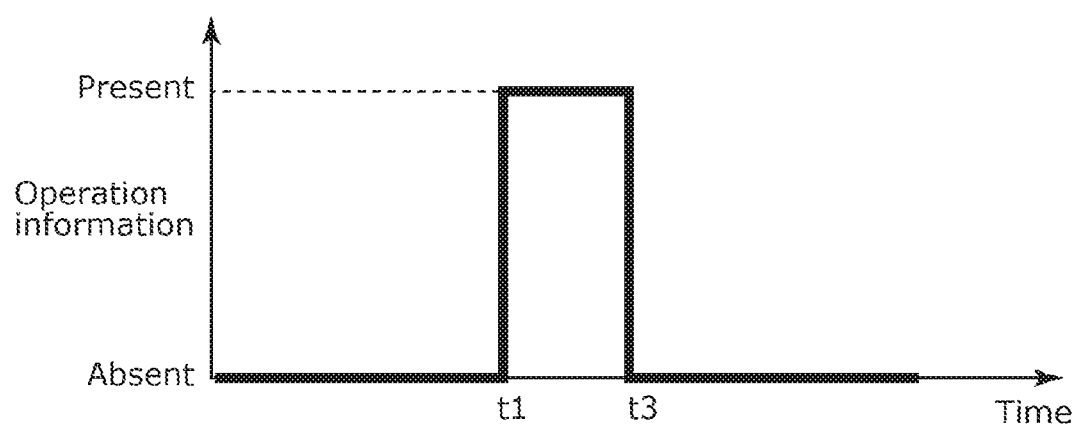
FIG. 10 is a schematic diagram for describing details of processing performed by the determiner by using an operation information in a sixth example according to the embodiment.

FIG. 10 is a schematic diagram for describing details of processing performed by determiner 14 by using the operation information in the sixth example according to the embodiment. More specifically, FIG. 10 illustrates a relationship between presence or absence of the operation information when vehicle 50 is running, and the elapsed time.

As illustrated in FIG. 10, determiner 14 may determine that first wheel 58a is free spinning when there is no operation information in the first predetermined period and there is the operation information at the first time point t1.

Further, at a third time point t3 after the first time point t1, determiner 14 may determine that the free spinning of first wheel 58a ceases when there is no operation information.

To summarize the sixth example, the drive state includes the operation information of ABS device 53, and determiner 14 determines that the first wheel is free spinning when the operation information suddenly changes.

In this way, determiner 14 can more accurately determine that the first wheel is free spinning.

Seventh Example

In the seventh example, the drive state includes a detected acceleration detected by the acceleration sensor. The detected acceleration is a detected acceleration in an upward or downward direction of vehicle 50, that is, in a vertically upward or downward direction of vehicle 50. In the seventh example, at the step S20 illustrated in FIG. 3, determiner 14 determines in advance that first wheel 58a will be free spinning when the detected acceleration in an upward or downward direction suddenly changes. More specifically, determiner 14 determines in advance that first wheel 58a will be free spinning at the first time point t1 when the detected acceleration in the upward or downward direction suddenly changes at a fourth time point prior to the first time point t1. In the seventh example, the detected acceleration in the upward or downward direction is designated as a detected acceleration (upward or downward).

Here, an example of the sudden change in the drive state (detected acceleration (upward or downward)) other than "3 examples of the sudden change in the drive state" described in [determiner 14] will be described.

The sudden change in the detected acceleration (upward or downward) means that the detected acceleration (upward or downward) at the fourth time point changes to or above a predetermined value or a predetermined rate with respect to an average of the detected acceleration (upward or downward) in a second predetermined period.

The second predetermined period is, for example, a period from the second time point to a point before the fourth time point excluding the fourth time point. The second time point is a time point prior to the fourth time point. In other words, the second predetermined period is a period starting at the second time point and ending before the fourth time point. The second predetermined period may be, for example, 10 minutes or less, 1 minutes or less, 30 seconds or less, or 10 seconds or less. The second time point is a time point a predetermined time before the fourth time point, and the predetermined time may be 10 minutes or less, 1 minutes or less, 30 seconds or less, or 10 seconds or less.

The predetermined value may be, for example, 10 km/h/s or less, 8 km/h/s or less, or 5 km/h/s or less. The predetermined rate may be, for example, 80% or less, 60% or less, or 40% or less of an average of the detected acceleration (upward or downward) in the second predetermined period. Accordingly, the sudden change means that the detected acceleration (upward or downward) at the fourth time point exceeds the threshold of the detected acceleration (upward or downward) defined according to the predetermined value or the predetermined rate.

Figure 11:
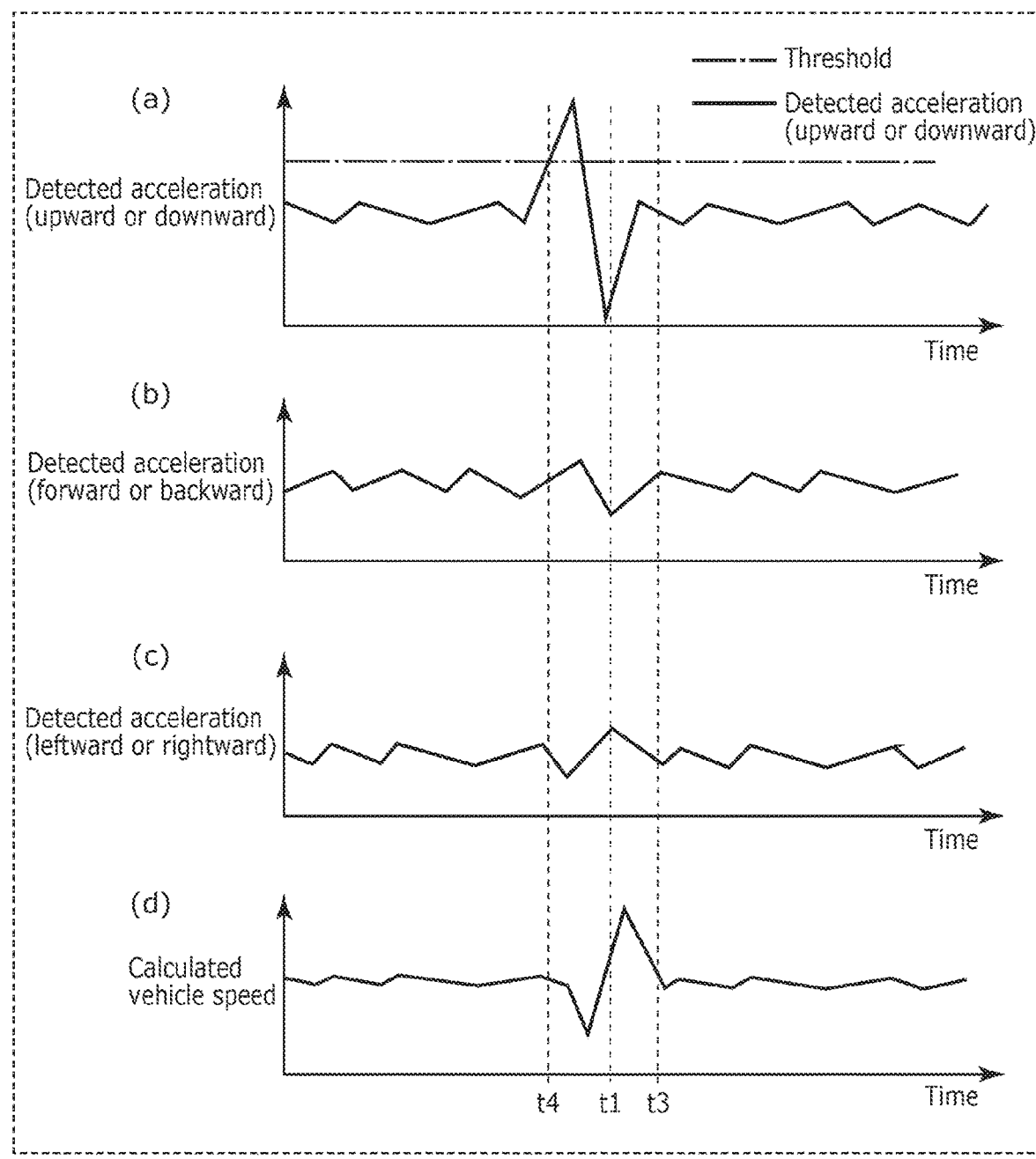
FIG. 11 is a schematic diagram for describing details of processing performed by the determiner by using a detected acceleration in a seventh example according to the embodiment.

FIG. 11 is a schematic diagram for describing details of processing performed by determiner 14 by using the detected acceleration (upward or downward) in the seventh example according to the embodiment. More specifically, the graph (a) in FIG. 11 illustrates a relationship among the detected acceleration (upward or downward) when vehicle 50 is running, the threshold of the detected acceleration (upward or downward), and the elapsed time. The graph (b) in FIG. 11 illustrates a relationship between the detected acceleration in the forward or backward direction of vehicle 50 (designated as detected acceleration (forward or backward) in FIG. 11) when vehicle 50 is running and the elapsed time. The graph (c) in FIG. 11 illustrates a relationship between the detected acceleration in a leftward or rightward direction of vehicle 50 (designated as detected acceleration (leftward or rightward) in FIG. 11) when vehicle 50 is running and the elapsed time. The graph (d) in FIG. 11 illustrates a relationship between the calculated vehicle speed and the elapsed time. The leftward or rightward direction of vehicle 50 is a direction perpendicular to the upward or downward direction and the forward or backward direction of vehicle 50. In the graphs (a), (b), (c), and (d) in FIG. 11, the same elapsed time is illustrated. The threshold of the detected acceleration (upward or downward) is a value that is 10 km/h/s or less larger than the average of the detected acceleration (upward or downward) in the second predetermined period.

In the seventh example, it is assumed that free spinning of first wheel 58a occurs when vehicle 50 is running over an obstacle such as a tree branch on the road surface.

When first wheel 58a runs over the obstacle, vehicle 50 is raised vertically; when vehicle 50 continues to move forward, vehicle 50 (more specifically, first wheel 58a) is brought into a floating state for a short time.

In this way, the time point at which vehicle 50 is raised vertically corresponds to the fourth time point t4, and at this time, the detected acceleration (upward or downward) changes. Further, the time point at which first wheel 58a starts to float corresponds to the first time point t1, and first wheel 58a is free spinning because the friction between first wheel 58a and the road surface is lost.

Accordingly, as illustrated in FIG. 11, it is predicted that when at the fourth time point t4, vehicle 50 is raised vertically upward and the detected acceleration (upward or downward) exceeds the threshold of the detected acceleration (upward or downward), first wheel 58a starts to float in the air into free spinning at the first time point t1. In other words, when the detected acceleration (upward or downward) suddenly changes at the fourth time point t4, determiner 14 determines in advance that first wheel 58a will be free spinning at the first time point t1.

To summarize the seventh example, the drive state includes the detected acceleration (upward or downward), and determiner 14 determines that the first wheel is free spinning when the detected acceleration (upward or downward) suddenly changes.

In this way, determiner 14 can determines in advance that the first wheel will be free spinning.

As illustrated in 7 examples (first example to seventh example), after processing by determiner 14, outputter 13 outputs, at the step S40, the simulated vehicle sound signal generated by generator 12 or outputs, at the step S60, the simulated vehicle sound signal corrected by corrector 15.

Further, determiner 14 may determine that the first wheel is free spinning in a combination of the 7 examples (first example to seventh example).

[Details of Processing Performed by Corrector 15]

Details of processing performed by corrector 15 will now be described with reference to 2 examples (the eighth and ninth examples).

Eighth Example

In the eighth example, corrector 15 corrects a frequency of the simulated vehicle sound signal generated based on the drive state that has suddenly changed.

Figure 12:
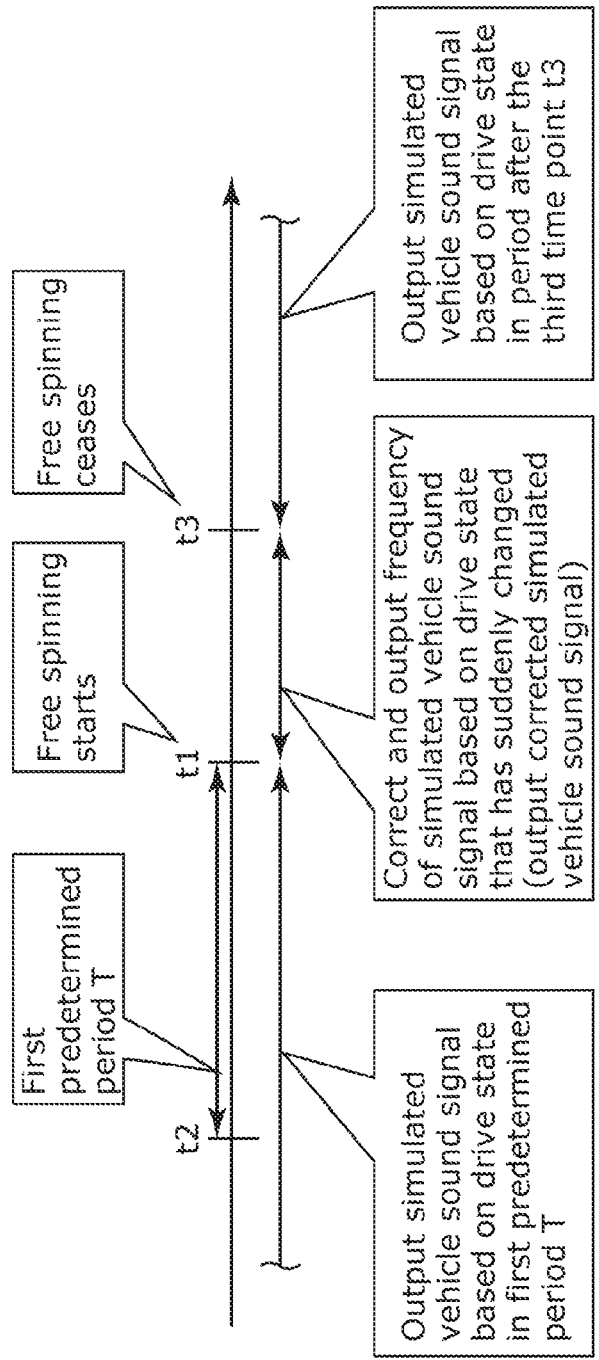
FIG. 12 is an illustration for describing an example of details of processing performed by a corrector in an eighth example according to the embodiment.

FIG. 12 is an illustration for describing an example of details of processing performed by corrector 15 in the eighth example according to the embodiment. More specifically, FIG. 12 illustrates timings at which corrector 15 makes a correction.

In FIG. 12, free spinning starts at the first time point t1, and determiner 14 determines that the first wheel is free spinning. Further, at the third time point t3, which is a time point after the first time point t1, the free spinning ceases, and determiner 14 determines that the first wheel is not free spinning. The first predetermined period T is the same as that in the first example, and is a period from the second time point t2 prior to the first time point t1 to a point before the first time point t1 excluding the first time point t1. The first predetermined period T is a period in which there is no sudden change, that is, no free spinning, in other words, a period before the drive state suddenly changes.

As described above, in the first predetermined period T and a period after the third time point t3, sound output device 10 performs processing of the steps S30 and S40 in FIG. 3.

From the first time point t1 to the third time point t3, corrector 15 corrects the simulated vehicle sound signal generated based on the drive state that has suddenly changed.

More specifically, generator 12 generates the simulated vehicle sound signal based on the drive state that has suddenly changed. At this time, the rotational speed of first wheel 58a has seen a rapid increase, and generator 12 generates the simulated vehicle sound signal based on the calculated vehicle speed calculated from the rapidly increased rotational speed or other factors.

Subsequently, corrector 15 corrects the simulated vehicle sound signal that is based on the drive state that has suddenly changed and generated by generator 12. Here, based on the simulated vehicle sound signal of the first predetermined period T in which there is no sudden change, corrector 15 corrects a frequency of the simulated vehicle sound signal that is based on the drive state that has suddenly changed.

Corrector 15 corrects a frequency such that frequency components in frequency characteristics of the simulated vehicle sound signal in the first predetermined period T are the same as frequency components of the simulated vehicle sound signal that is based on the drive state that has suddenly changed.

At this time, corrector 15 may correct the level of the simulated vehicle sound signal as described below. First, corrector 15 takes, as a reference, an average of the level of the simulated vehicle sound signal in the first predetermined period T. Corrector 15 makes a correction such that the level of the simulated vehicle sound signal that is based on the drive state that has suddenly changed does not reach a predetermined value or a predetermined rate from the reference.

The predetermined rate may be, for example, 80% or less, 60% or less, or 40% or less of the average in the first predetermined period T.

In this way, even when the first wheel is free spinning, corrector 15 corrects the simulated vehicle sound signal such that it has a frequency and level that are close to those of the simulated vehicle sound signal output in a period in which there is no free spinning (first predetermined period T). In other words, corrector 15 corrects the simulated vehicle sound signal such that the driver is less likely to feel the simulated vehicle sound corresponding to the simulated vehicle sound signal as an abnormal sound.

As illustrated in FIG. 3, at the step S60, the corrected simulated vehicle sound signal is output.

To summarize the eighth example, even when the first wheel is free spinning, a rapid change in the frequency and level of the simulated vehicle sound is suppressed. Consequently, the simulated vehicle sound signal of such a frequency that the driver feels as an abnormal sound is prevented from being output, so that the driver is less likely to be surprised. Accordingly, the sound output device 10 that helps securing driving safety is provided.

Ninth Example

In the ninth example, corrector 15 corrects the simulated vehicle sound signal generated based on the drive state that has suddenly changed by replacing it with the simulated vehicle sound signal generated in the first predetermined period T, which is before the drive state has suddenly changed.

Figure 13:
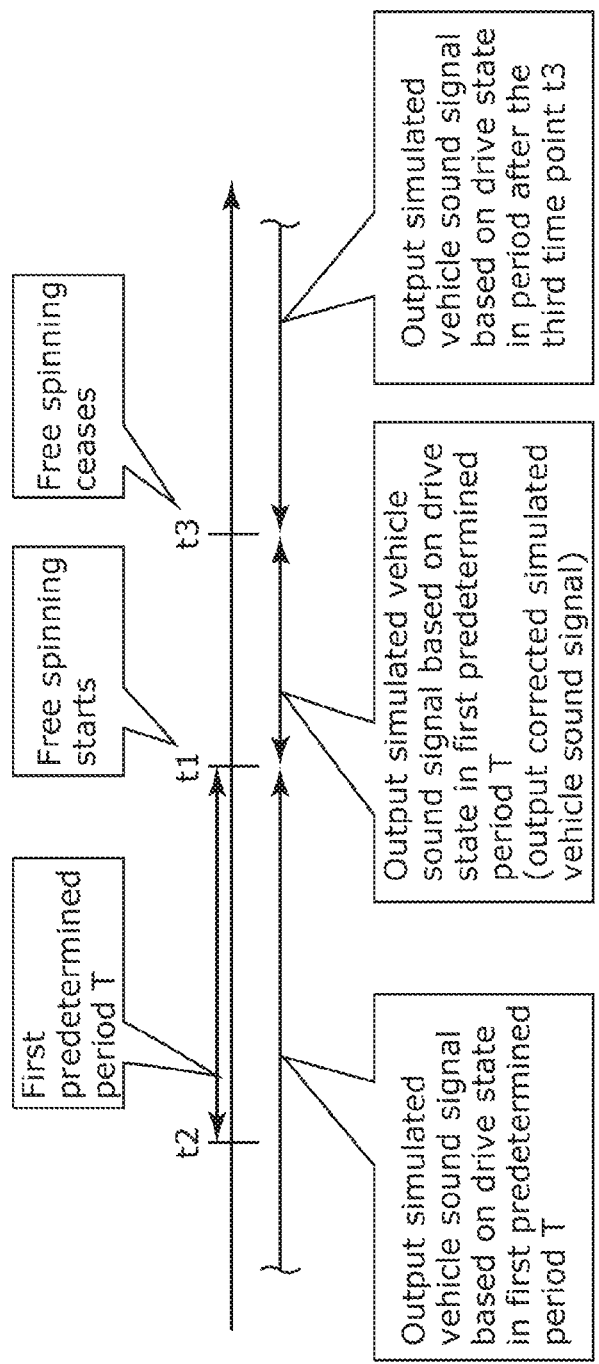
FIG. 13 is an illustration for describing another example of details of processing performed by the corrector in a ninth example according to embodiment.

FIG. 13 is an illustration for describing another example of details of processing performed by corrector 15 in the ninth example according to the embodiment. More specifically, FIG. 13 illustrates timings at which corrector 15 makes a correction.

As with the eighth example, from the first time point t1 to the third time point t3, corrector 15 corrects the simulated vehicle sound signal generated based on the drive state that has suddenly changed.

In this case, the simulated vehicle sound signal generated by generator 12 in the first predetermined period T, which is before the drive state has suddenly changed, is stored in storage 16. Corrector 15 corrects the simulated vehicle sound signal generated based on the drive state that has suddenly changed by replacing it with the simulated vehicle sound signal generated in the first predetermined period T, which is stored in storage 16. In other words, corrector 15 corrects the simulated vehicle sound signal such that the driver is less likely to feel the simulated vehicle sound corresponding to the simulated vehicle sound signal as an abnormal sound.

As illustrated in FIG. 3, at the step S60, the corrected simulated vehicle sound signal is output.

Even when the first wheel is free spinning, a rapid change in the simulated vehicle sound is suppressed. Consequently, the simulated vehicle sound signal of such a frequency that the driver feels as an abnormal sound is prevented from being output, so that the driver is less likely to be surprised. Accordingly, sound output device 10 that helps securing driving safety is provided.

In the ninth example, correction may be made as described below.

In this case, the drive state in the first predetermined period T, which is before the drive state has suddenly changed, that is, the drive state that does not suddenly change is stored in storage 16. Corrector 15 may correct the simulated vehicle sound signal generated based on the drive state that has suddenly changed by replacing it with the simulated vehicle sound signal generated based on the drive state that does not suddenly change, which is stored in storage 16.

Also in this case, the simulated vehicle sound signal of such a frequency that the driver feels as an abnormal sound is prevented from being output, so that sound output device 10 that helps securing driving safety is provided.

Conclusion

As described above, sound output device 10 according to the above-described embodiment is provided in vehicle 50, and includes: obtainer 11 that obtains a drive state of vehicle 50; generator 12 that generates a simulated vehicle sound signal based on the drive state obtained; outputter 13 that outputs the simulated vehicle sound signal generated; determiner 14 that determines that first wheel 58a of vehicle 50 is free spinning when the drive state obtained suddenly changes; and corrector 15 that corrects the simulated vehicle sound signal generated based on the drive state that has suddenly changed, when determiner 14 determines that first wheel 58a is free spinning. Here, outputter 13 outputs the simulated vehicle sound signal corrected.

Accordingly, when the drive state of vehicle 50 does not suddenly change, outputter 13 outputs the simulated vehicle sound signal with which the driver perceives the drive state of vehicle 50. Further, when the drive state of vehicle 50 suddenly changes, that is, first wheel 58a of vehicle 50 is free spinning, corrector 15 makes a correction such that the driver is less likely to feel the simulated vehicle sound corresponding to the simulated vehicle sound signal as an abnormal sound. Consequently, an abnormal sound is prevented from being output from outputter 13, so that driver is less likely to be surprised. Accordingly, sound output device 10 that helps allowing the driver to perceive the drive state of vehicle 50 and securing driving safety is provided.

For example, the drive state includes a calculated vehicle speed of vehicle 50 which is calculated from a rotational speed of first wheel 58a, and determiner 14 determines that first wheel 58a is free spinning when the calculated vehicle speed suddenly changes.

In this way, determiner 14 can more accurately determine that the first wheel is free spinning.

For example, the drive state includes a detected acceleration in a forward or backward direction of vehicle 50 which is detected by an acceleration sensor, and determiner 14 determines that first wheel 58a is free spinning when the calculated vehicle speed suddenly changes and the detected acceleration does not suddenly change.

In this way, determiner 14 can more accurately determine that the first wheel is free spinning.

For example, the drive state includes a calculated acceleration of vehicle 50 which is calculated from a rotational speed of first wheel 58a, and determiner 14 determines that first wheel 58a is free spinning when the calculated acceleration suddenly changes.

In this way, determiner 14 can more accurately determine that the first wheel is free spinning.

For example, the drive state includes a torque of an electric motor of vehicle 50, and determiner 14 determines that first wheel 58a is free spinning when the torque suddenly changes.

In this way, determiner 14 can more accurately determine that the first wheel is free spinning.

For example, the drive state includes a rotational speed of an electric motor of vehicle 50, and determiner 14 determines that first wheel 58a is free spinning when the rotational speed of the electric motor suddenly changes.

In this way, determiner 14 can more accurately determine that the first wheel is free spinning.

For example, the drive state includes a difference between a rotational speed of first wheel 58a and a rotational speed of a second wheel of vehicle 50, and determiner 14 determines that first wheel 58a is free spinning when the difference suddenly changes.

In this way, determiner 14 can more accurately determine that the first wheel is free spinning.

For example, the drive state includes operation information of an anti-lock braking system (ABS) device in vehicle 50, and determiner 14 determines that first wheel 58a is free spinning when the operation information suddenly changes.

In this way, determiner 14 can more accurately determine that the first wheel is free spinning.

For example, the drive state includes a detected acceleration in an upward or downward direction of vehicle 50, the detected acceleration being detected by an acceleration sensor, and determiner 14 determines in advance that first wheel 58a is free spinning when the detected acceleration in the upward or downward direction suddenly changes.

In this way, determiner 14 can determines in advance that the first wheel will be free spinning.

For example, corrector 15 corrects a frequency of the simulated vehicle sound signal generated based on the drive state that has suddenly changed.

Accordingly, even when the first wheel is free spinning, a rapid change in the frequency of the simulated vehicle sound is suppressed. Consequently, the simulated vehicle sound signal of such a frequency that the driver feels as an abnormal sound is prevented from being output, so that the driver is less likely to be surprised. Accordingly, sound output device 10 that helps securing driving safety is provided.

For example, corrector 15 corrects the simulated vehicle sound signal generated based on the drive state that has suddenly changed, by replacing the simulated vehicle sound signal with a simulated vehicle sound signal generated in a predetermined period prior to the sudden change of the drive state.

Accordingly, even when the first wheel is free spinning, a rapid change in the simulated vehicle sound is suppressed. Consequently, the simulated vehicle sound signal of such a frequency that the driver feels as an abnormal sound is prevented from being output, so that the driver is less likely to be surprised. Accordingly, sound output device 10 that helps securing driving safety is provided.

Furthermore, the sound output method according to the above-described embodiment is executed by sound output device 10 provided in vehicle 50, and includes an obtaining step, a generating step, an outputting step, a determining step, and a correcting step. In the obtaining step, a drive state of vehicle 50 is obtained. In the generating step, a simulated vehicle sound signal is generated based on the drive state obtained. In the outputting step, the simulated vehicle sound signal is generated. In the determining step, it is determined that a first wheel of vehicle 50 is free spinning when the drive state obtained suddenly changes. In the correcting step, the simulated vehicle sound signal generated based on the drive state that has suddenly changed is corrected, when the determination is made that first wheel 58a is free spinning. In the outputting step, the simulated vehicle sound signal corrected in the correcting is outputted.

Accordingly, when the drive state of vehicle 50 does not suddenly change, in the outputting step, the simulated vehicle sound signal with which the driver perceives the drive state of vehicle 50 is output. Further, when the drive state of vehicle 50 suddenly changes, that is, first wheel 58a of vehicle 50 is free spinning, in the correcting step, a correction is made such that the driver is less likely to feel the simulated vehicle sound corresponding to the simulated vehicle sound signal as an abnormal sound. Consequently, an abnormal sound is prevented from being output in the outputting step, so that driver is less likely to be surprised. Accordingly, sound output method that helps allowing the driver to perceive the drive state of vehicle 50 and securing driving safety is provided.

Other Embodiments

Although the present disclosure has been described based on the embodiment, the present disclosure is not limited to the above-described embodiment.

For example, in the above-described embodiment, although vehicle controller 52 calculates the vehicle speed of vehicle 50 from the rotational speed of first wheel 58a, it is not a limitation. For example, vehicle controller 52 may output a signal that depends on the rotational speed of the wheel (here, first wheel 58a) to sound output device 10. Here, a pulsed signal is used for the signal and the frequency of the pulsed signal is proportional to, for example, the rotational speed of first wheel 58a. The signal is not limited to a pulsed signal. Any other processing part than those described above in sound output device 10 may calculate the vehicle speed of vehicle 50 based on a signal that depends on the rotational speed of first wheel 58a output from vehicle controller 52. Similarly, any other processing part than those described above may calculate the acceleration or the like of vehicle 50.

It should be noted that, for example, sound output device 10 according to the above-described embodiment may be provided to a moving device other than vehicle 50. For example, the moving device may be an aircraft or a ship. The present disclosure may be implemented to a moving device other than such vehicle 50.

It should also be noted that the structure of sound output device 10 according to the above-described embodiment is an example. For example, sound output device 10 may include constituent elements such as a digital-analog (D/A) converter, a filter, a power amplifier, and an analog-digital (A/D) converter.

It should also be noted that the processing performed by sound output device 10 according to the above-described embodiment is an example. For example, a part of the digital signal processing described in the above-described embodiment may be realized by analog signal processing.

It should also be noted that, for example, it is possible in the above-described embodiment that the process performed by a certain processing unit may be performed by another processing unit, that an order of a plurality of processes is changed, or that a plurality of processes are performed in parallel.

It should also be noted that, in the above-described embodiment, each of the constituent elements may be implemented by executing a software program suitable for the constituent element. Each of the constituent elements may be implemented when a program executing unit, such a central processing unit (CPU) or a processor, reads a software program from a recording medium, such as a hard disk or a semiconductor memory, and executes the readout software program.

It should also be noted that, in the above-described embodiment, each of the constituent elements may be implemented into a hardware. For example, the constituent elements may be circuits (or integrated circuits). These circuits may form a single circuit, or serve as separate circuits. Each circuit may be may be a general-purpose circuit or a dedicated circuit.

It should also be noted that, the constituent elements may be circuits (or integrated circuits). These circuits may form a single circuit, or serve as separate circuits. Each circuit may be may be a general-purpose circuit or a dedicated circuit.

It should also be noted that general or specific aspects of the present disclosure may be implemented to a system, a device, a method, an integrated circuit, a computer program, a non-transitory computer-readable recording medium such as a Compact Disc-Read Only Memory (CD-ROM), or any given combination thereof.

For example, the present disclosure may be implemented to the sound output method executed by sound output device 10 (computer or DSP), or may be implemented to a program causing the computer or the DSP to execute the sound output method. The present disclosure may be implemented to a non-transitory computer-readable recording medium on which the program is recorded. The present disclosure may be implemented to a moving device (for example, vehicle 50) or a sound output system. The moving device or the sound output system includes, for example, sound output device 10 according to the embodiment and a reference signal source.

In addition, the present disclosure may include embodiments obtained by making various modifications on the above-described embodiment which those skilled in the art will arrive at, or embodiments obtained by selectively combining the elements and functions disclosed in the above-described embodiment, without materially departing from the scope of the present disclosure.

Further Information about Technical Background to this Application

The disclosure of the following patent application including specification, drawings, and claims is incorporated herein by reference in their entirety: Japanese Patent Application No. 2021-057112 filed on Mar. 30, 2021.

INDUSTRIAL APPLICABILITY

The sound output device of the present disclosure is useful for, for example, a device that generates a simulated vehicle sound.

The invention claimed is:

1. A sound output device provided in a vehicle, the sound output device comprising:
   an obtainer that obtains a drive state of the vehicle;
   a generator that generates a simulated vehicle sound signal based on the drive state obtained;
   an outputter that outputs the simulated vehicle sound signal generated;
   a determiner that determines that a first wheel of the vehicle is free spinning when the drive state obtained suddenly changes; and
   a corrector that corrects the simulated vehicle sound signal generated based on the drive state that has suddenly changed, when the determiner determines that the first wheel is free spinning, wherein
   the outputter outputs the simulated vehicle sound signal corrected.

2. The sound output device according to claim 1, wherein
   the drive state includes a calculated vehicle speed of the vehicle which is calculated from a rotational speed of the first wheel, and
   the determiner determines that the first wheel is free spinning when the calculated vehicle speed suddenly changes.

3. The sound output device according to claim 2, wherein
   the drive state includes a detected acceleration in a forward or backward direction of the vehicle which is detected by an acceleration sensor, and
   the determiner determines that the first wheel is free spinning when the calculated vehicle speed suddenly changes and the detected acceleration does not suddenly change.

4. The sound output device according to claim 1, wherein
   the drive state includes a calculated acceleration of the vehicle which is calculated from a rotational speed of the first wheel, and
   the determiner determines that the first wheel is free spinning when the calculated acceleration suddenly changes.

5. The sound output device according to claim 1, wherein
   the drive state includes a torque of an electric motor of the vehicle, and
   the determiner determines that the first wheel is free spinning when the torque suddenly changes.

6. The sound output device according to claim 1, wherein
   the drive state includes a rotational speed of an electric motor of the vehicle, and
   the determiner determines that the first wheel is free spinning when the rotational speed of the electric motor suddenly changes.

7. The sound output device according to claim 1, wherein
the drive state includes a difference between a rotational speed of the first wheel and a rotational speed of a second wheel of the vehicle, and
the determiner determines that the first wheel is free spinning when the difference suddenly changes.

8. The sound output device according to claim 1, wherein
the drive state includes operation information of an anti-lock braking system (ABS) device in the vehicle, and
the determiner determines that the first wheel is free spinning when the operation information suddenly changes.

9. The sound output device according to claim 1, wherein
the drive state includes a detected acceleration in an upward or downward direction of the vehicle, the detected acceleration being detected by an acceleration sensor, and
the determiner determines in advance that the first wheel is free spinning when the detected acceleration in the upward or downward direction suddenly changes.

10. The sound output device according to claim 1, wherein
the corrector corrects a frequency of the simulated vehicle sound signal generated based on the drive state that has suddenly changed.

11. The sound output device according to claim 1, wherein
the corrector corrects the simulated vehicle sound signal generated based on the drive state that has suddenly changed, by replacing the simulated vehicle sound signal with a simulated vehicle sound signal generated in a predetermined period prior to the sudden change of the drive state.

12. A sound output method executed by a sound output device provided in a vehicle, the sound output method comprising:
obtaining a drive state of the vehicle;
generating a simulated vehicle sound signal based on the drive state obtained;
outputting the simulated vehicle sound signal generated;
determining that a first wheel of the vehicle is free spinning when the drive state obtained suddenly changes; and
correcting the simulated vehicle sound signal generated based on the drive state that has suddenly changed, when the determination is made that the first wheel is free spinning, wherein
in the outputting, the simulated vehicle sound signal corrected in the correcting is outputted.

* * * * *